Sept. 8, 1959 J. B. HENNION 2,903,269
TELESCOPING SHOPPING CART HAVING MOVABLE
LOWER PACKAGE SUPPORT
Filed Oct. 24, 1956 2 Sheets-Sheet 1

INVENTOR
JOSEPH B. HENNION

BY

ATTORNEYS

Sept. 8, 1959

J. B. HENNION 2,903,269

TELESCOPING SHOPPING CART HAVING MOVABLE
LOWER PACKAGE SUPPORT

Filed Oct. 24, 1956

INVENTOR
JOSEPH B. HENNION

BY

ATTORNEYS

United States Patent Office 2,903,269
Patented Sept. 8, 1959

2,903,269

TELESCOPING SHOPPING CART HAVING MOVABLE LOWER PACKAGE SUPPORT

Joseph B. Hennion, Niles, Mich., assignor to Tyler Refrigeration Corporation, Niles, Mich., a corporation of Michigan Application October 24, 1956, Serial No. 618,075

5 Claims. (Cl. 280—33.99)

This invention relates to improvements in a shopping cart of the class in which two or more carts may be stored in telescoped relation with respect to each other, and more particularly, has to do with novel frame and package receiving means, in the form of baskets or the like, affording ease of loading and unloading.

Known carts of the class referred to incorporate a wheeled main frame supporting an upper basket and a lower stationary tray or basket, with the arrangement being such that the frame and upper and lower baskets of one cart may be telescoped with like elements of another cart. In such known constructions, the lower stationary trays or baskets are inconvenient to load and are especially difficult to unload, for example, when the cart is positioned in the conventional restricted aisle alongside a check-out cashier, in that such aisle prevents ready access from the sides of the cart to the lower basket. As a consequence, such lower trays are infrequently used and occasionally, when used, merchandise thereon is overlooked and not charged out by the cashier.

It is an object of the present invention to provide an improved shopping cart of the above class.

Another object of the present invention is to provide a shopping cart having lower package receiving means or a lower carrier unit normally disposed on an inclined plane for telescopic association with the like part of a second cart, but in which such package receiving means or carrier unit is readily or easily disposed in a horizontal plane for carrying or supporting merchandise.

Another object of the present invention is to provide a shopping cart as last related, in which the lower package receiving means comprises a slidable member, preferably slidable rearwardly outwardly of the cart, to facilitate loading and unloading thereof.

These and other objects will be apparent from the following description of a preferred embodiment of my invention.

Now, in order to acquaint those skilled in the art with the manner of constructing and utilizing a shopping cart in accordance with my invention, I shall describe, in conjunction with the following drawings, a preferred embodiment of my invention.

Figure 1:
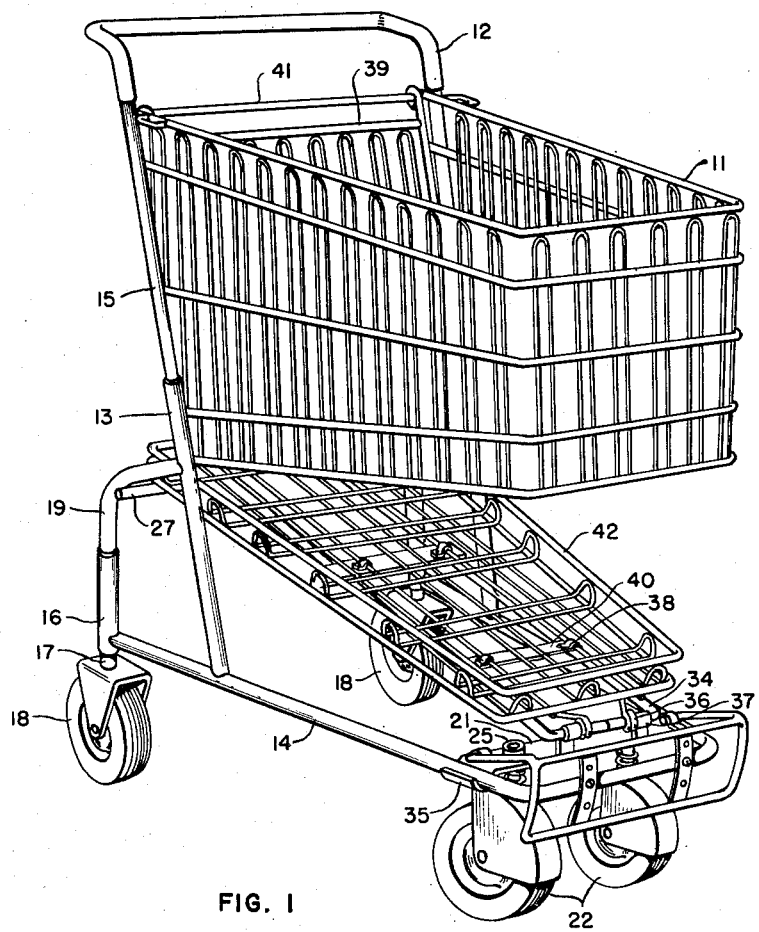
Figure 1 is a perspective view of a preferred embodiment of shopping cart constructed in accordance with the principles of my invention.
Figure 4:
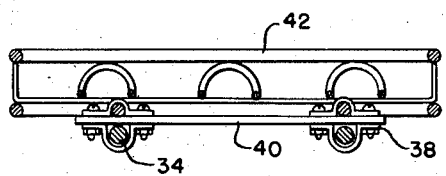
Figure 4 is a sectional view of the lower carrier unit taken along the line 4—4 of Figure 3, looking in the direction of the arrows.

Referring now to Figure 1, it will be seen that the shopping cart of my invention comprises a main lower frame 14, substantially U-shaped in plan, formed of tubular material and to which, at the forward end thereof, is attached a pair of brackets 35. The brackets 35 are riveted or otherwise suitably secured to a front wheel supporting frame or anchor plate 21. The free ends of the frame are diverging so as to give the frame an essentially blunt wedge shape in plan. The free ends of the frame 14 have secured thereto a substantially vertically extending tubular member 16. The member 16 at each free end of frame 14 serves as a bearing or support for a rear wheel journal post 17 of each rear wheel assembly 18. A tubular brace 13 intersects the frame 14 along each of its legs while a brace 19 interconnects each brace 13 with the respective vertical post 16. By virtue of this construction, the rear lower portion of the cart is open, to permit telescoping of the cart.

A pair of front wheel assemblies 22, in the form preferably of casters, are mounted on the anchor plate 21 and are fastened thereto by collars 25, one of which is shown in Figure 1, to thereby form a dolly for support of the front end of the cart.

The aforementioned inclined intermediate braces 13 serve as a positioning device for the free ends 15 of a generally U-shaped handle 12 for the cart. The free ends of the handle 12 are insertable telescopically, one each into braces 13 to position the handle 12 and also serve as positioning and retaining means for the upper package receiving member, such as basket 11, which is attached near the handle 12 and from which it is supported in cantilever fashion. The members 13 and 15 are secured in adjusted telescopic relation by suitable screw means and are arranged so that, in assembled position, they retain the rearward end of basket 11 in clamped relation on the cart. The basket is formed at its rearward end with suitable lugs or projections which engage with the free arm portions 15 of handle 12, so that when the rear end of the basket is clamped in position by appropriate positioning of handle 12 relative to tubular frame elements 13, the basket 11 is supported in cantilever fashion from its rear end. The arrangement provides for the ready and easy removal of the upper basket so that, if desired, displays or pyramids of goods may be arranged on the lower carrying unit whereby the cart has utility for portable display purposes.

Figure 2:
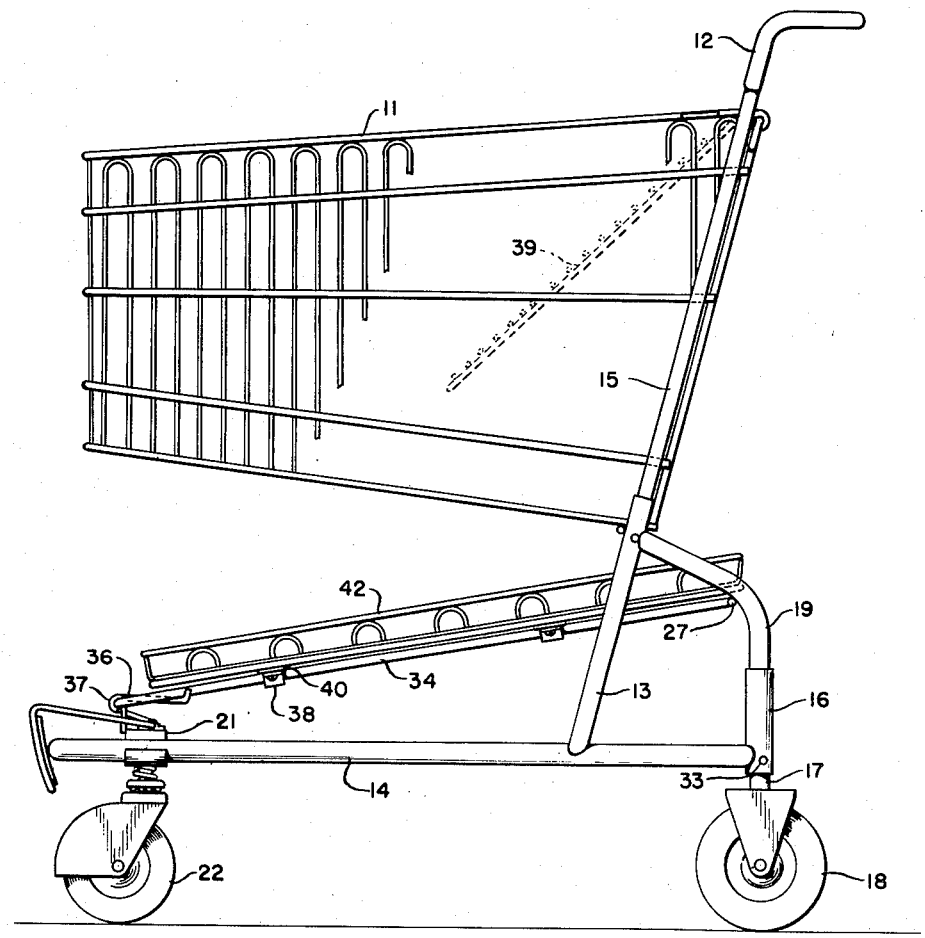
Figure 2 is a side elevational view of the shopping cart of Figure 1.
Figure 3:
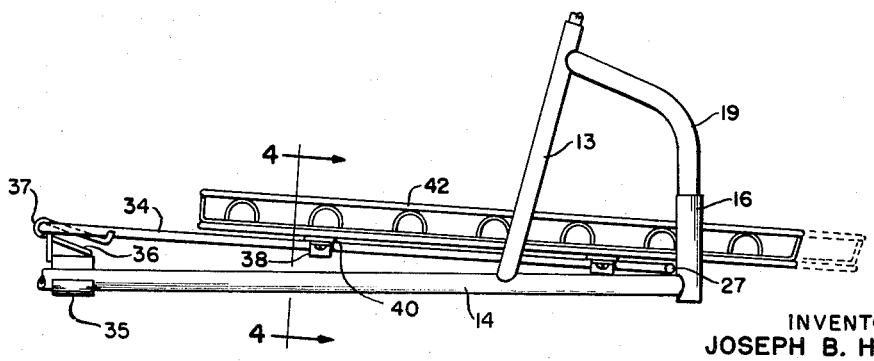
Figure 3 is a detail elevational view of the lower package receiving means or carrier unit and associated parts.

Referring now to Figures 2 and 3, it will be seen that I have provided a lower rack comprising a lower frame 34 pivotally secured at its forward end to the front anchor plate 21 by means of a pair of spaced journal supports 37. The frame 34 comprises a U-shaped rod, the front member or bight portion of which is pivotally mounted in the supports 37. Spring means 36, shown as a torsion spring, encircles the front end member of the frame 34 and bears at one end against anchor plate 21 and at its other end against a portion of the frame 34 normally to urge the frame upwardly about the pivotal axis formed by journals 37. The preferred form of spring comprises a U-shaped piece of spring wire having the bight portion thereof engaging the plate 21 and each of the two legs thereof encircling the bight portion of the rod 34, the two legs thereof at their free ends engaging against the lower side of the adjacent leg of the frame, thereby normally to retain the rearward end of the frame 34 in elevated position. At its rearward end, the frame includes a tie rod or bar 27 fastened across the free rearward ends of the legs of the rod 34 and extending under the braces 19 thereby to define a stop limiting upward movement of the lower rack and normally disposing the entirety of the rack at a level lower than the upper rack or basket 11.

A lower package supporting means or carrier unit, shown as a basket 42, is slidably mounted on the upper surface of the frame 34 by means of two pairs of U clamp means 38 slidably engaging the longitudinally extending legs of the U-shaped frame and fixedly secured to the wire or rod elements forming the bottom of the lower basket 42. Each pair of U clamp means is preferably bound together by a transverse strap 40 of any suitable material, such as nylon or steel, to maintain friction at a minimum.

The upper basket 11 is of the telescoping type in which the rear wall 39 of the basket is pivotally connected to the top rung 41 thereof. This permits the back wall 39 of the basket 11 to be rotated into a substantially horizontal position when one cart is telescoped into another cart of the same construction.

In using the cart of the present invention for shopping, the shopper may readily lower the rear end of the basket 42 by pushing down on it or placing a package thereon to overcome the upward biasing force of spring 36 and thereby dispose the basket and its frame down in a substantially horizontal position in which the tie rod 27 rests on the frame 14 and is held in place by the weight thereon. The lower basket may also be slid rearwardly outwardly from under the upper basket 11 to an extent rendering the goods thereon readily accessible from the back of the cart. When the lower basket 42 is being used to carry merchandise, it is, of course, in a horizontal position and will remain so as long as there is merchandise on the basket of sufficient weight to overcome the bearing force of the torsion spring means. Upon removal of the merchandise from the basket, the torsion spring 36 will return the rod 34 and thereby the basket 42 to its inclined position, thereby readying the basket to be nested relative to a like basket arrangement of a second like cart.

In regard to the frame of the cart defined by main frame 14, tubular members 13, 16 and 19, it is to be observed that the members 13 intersect the free arms of main frame 14 a short distance inwardly of the rear end of the cart, and that the tubular members 16 and 19 brace the tubular members 13 in position in which the latter extend angularly upwardly and rearwardly of the cart. The horizontal grip portion of the handle projects but a slight distance rearwardly beyond the rear wheels, but the inclination of frame members 13 and the continuation of such inclination of the free arm members of the handle provide more than adequate leg room for a person to push the cart in a forward direction. Further, in regard to such arrangement of parts, the lower carrier unit may be disposed to the rearwardly outwardly projected position shown, for example, by the dotted lines in Figure 3, and a substantial weight at that end of the lower carrier unit will not tilt the cart rearwardly about the rear wheels. As a matter of fact, in carts of the construction herein illustrated, a child may stand on the projecting end of the lower carrier unit without tilting the cart. Also, under such circumstances, the aforementioned frame arrangement, due to the angular disposition of the tubular members 13, affords sufficient room for the forward projection of the cart by a person's conventional pushing position relative to the handle for the cart.

While I have shown and described what I consider to be a preferred embodiment of my invention, it is, of course, understood that the invention shown therein may be modified and used in other embodiments without departing from the spirit and scope of this invention.

I claim:

1. In a shopping cart of the type adapted for telescopic storage with like carts and having a frame and an upper package support, the improvement comprising a lower package support including a rack pivotally mounted at its forward end on the forward end of the frame in downwardly spaced relation to the upper package support, a lower package carrier slidably mounted on said rack for movement longitudinally of the cart, and resilient means on the cart for biasing the rearward end of said rack upwardly thereby normally to dispose said rack and said lower package carrier at an inclination to accommodate telescopic association with one cart of like carts, the rearward end of said rack being movable downwardly to facilitate loading of said lower package carrier, said resilient means being of a strength only slightly greater than that required to elevate the rearward portions of said rack and said lower package carrier whereby said lower package carrier, when loaded, is disposed substantially horizontal, said lower package carrier in the forwardmost position thereof being generally co-extensive with the upper package support and being movable rearwardly thereof to facilitate loading and unloading of said lower package carrier.

2. In a shopping cart of the type adapted for telescopic storage with like carts and having a rearwardly open forwardly tapered frame of generally U-shape as viewed in plan and a forwardly tapered upper package support, the improvement comprising a U-shaped rod pivotally connected at the bight portion thereof to the bight portion of the frame adjacent the forward end of the cart and in downwardly spaced relation to the upper package support, the legs of said rod extending in spaced parallel relation longitudinally of the cart to adjacent the rearward end thereof, a lower package support slidably mounted on the legs of said rod to the upper side thereof, said lower package support in its forwardmost position being disposed substantially within the margins of the frame and in downwardly spaced relation to the upper package support, said lower package support being slidable rearwardly on the legs of said rod to a position rearwardly of the upper package support, and spring means confined between the frame and the legs of said rod normally biasing the rearward end portions of the legs of said rod upwardly to dispose said rod and said lower package support in an inclined plane.

3. In a shopping cart of the type adapted for telescopic storage with like carts and having a rearwardly open forwardly tapered frame of generally U-shape as viewed in plan and a forwardly tapered upper package support, the improvement comprising a U-shaped rod pivotally connected at the bight portion thereof to the bight portion of the frame adjacent the forward end of the cart and in downwardly spaced relation to the upper package support, the legs of said rod extending in spaced parallel relation longitudinally of the cart to adjacent the rearward end thereof, a lower package support slidably mounted on the legs of said rod to the upper side thereof, said lower package support in its forwardmost position being disposed substantially within the margins of the frame and in downwardly spaced relation to the upper package support, said lower package support being slidable rearwardly on the legs of said rod to a position rearwardly of the upper package support, spring means confined between the frame and the legs of said rod normally biasing the rearward end portions of the legs of said rod upwardly to dispose said rod and said lower package support in an inclined plane, said spring means being of a strength only slightly greater than that required to elevate the rearward portions of said rod and said lower package support and accommodating disposition of said rod and said lower package support in a substantially horizontal position when said lower package support is loaded, and stop means on the rearward end portions of said rod engageable with the frame for limiting vertical movement of the rearward portions of said rod and said lower package support and engageable by said lower package support to limit rearward movement of the same.

4. In a shopping cart of the type adapted for telescopic storage with like carts and having a frame, the improvement comprising a rigid lower package support, and means for pivotally mounting said lower package support adjacent its forward edge on the frame adjacent the front of the cart, the portions of said support rearwardly of the pivotal mounting thereof normally extending upwardly and rearwardly from said mounting in an inclined position accommodating telescopic association with one cart of like carts, in which association the lower package support of one cart is superimposed over the lower package supports of like carts, said portions of said support being movable downwardly to a generally horizontal position to facilitate loading of said support.

5. In a shopping cart of the type adapted for telescopic storage with like carts and having a frame, the improvement comprising an elongated rigid lower package support extending substantially from the front to the rear of the frame, means for pivotally mounting said lower package support adjacent its forward edge on the frame adjacent the front of the cart, the portions of said support rearwardly of the pivotal mounting thereof normally extending upwardly and rearwardly from said mounting in an inclined position accommodating telescopic association with one cart of like carts, in which association the lower package support of one cart is superimposed over the lower package supports of like carts, and means for normally retaining said portions of said support in said inclined position, said portions of said support being movable downwardly to a generally horizontal position to facilitate loading of said support.

References Cited in the file of this patent

UNITED STATES PATENTS

| | | |
|---|---|---|
| 72,956 | Young et al. | Dec. 31, 1867 |
| 1,158,947 | McGregor | Nov. 2, 1915 |
| 1,427,275 | Fageol | Aug. 29, 1922 |
| 1,542,510 | Lancia | June 16, 1925 |
| 1,953,688 | Otte | Apr. 3, 1934 |
| 1,973,416 | Otte | Sept. 11, 1934 |
| 2,005,938 | Graves | June 25, 1935 |
| 2,255,863 | Shuey | Sept. 16, 1941 |
| 2,479,530 | Watson | Aug. 16, 1949 |
| 2,524,617 | Wyse | Oct. 3, 1950 |
| 2,556,532 | Goldman | June 12, 1951 |
| 2,583,513 | Maslow | Jan. 22, 1952 |
| 2,605,116 | Alexander | July 29, 1952 |
| 2,639,161 | Goldman | May 19, 1953 |
| 2,674,662 | Dracos et al. | Apr. 6, 1954 |
| 2,738,201 | Spears | Mar. 13, 1956 |